(12) United States Patent
Takahashi

(10) Patent No.: US 9,701,300 B2
(45) Date of Patent: Jul. 11, 2017

(54) HYBRID VEHICLE

(71) Applicant: TOYOTA JIDOSHA KABUSHIKI KAISHA, Toyota-shi, Aichi-ken (JP)

(72) Inventor: Yoshimitsu Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 14/933,303

(22) Filed: Nov. 5, 2015

(65) Prior Publication Data

US 2016/0129903 A1    May 12, 2016

(30) Foreign Application Priority Data

Nov. 7, 2014   (JP) ................. 2014-227132

(51) Int. Cl.
| | |
|---|---|
| *B60W 10/08* | (2006.01) |
| *B60W 20/15* | (2016.01) |
| *B60K 6/445* | (2007.10) |
| *B60W 10/06* | (2006.01) |
| *B60K 6/448* | (2007.10) |
| *B60K 6/52* | (2007.10) |
| *B60W 30/18* | (2012.01) |

(52) U.S. Cl.
CPC ............ *B60W 10/08* (2013.01); *B60K 6/445* (2013.01); *B60K 6/448* (2013.01); *B60K 6/52* (2013.01); *B60W 10/06* (2013.01); *B60W 20/15* (2016.01); *B60W 30/18072* (2013.01); *B60W 30/18127* (2013.01); *B60W 30/18136* (2013.01); *B60Y 2200/92* (2013.01); *Y02T 10/623* (2013.01); *Y02T 10/6239* (2013.01); *Y02T 10/6243* (2013.01); *Y02T 10/6265* (2013.01); *Y02T 10/6286* (2013.01); *Y02T 10/7077* (2013.01); *Y02T 10/7275* (2013.01); *Y10S 903/906* (2013.01); *Y10S 903/91* (2013.01); *Y10S 903/93* (2013.01)

(58) Field of Classification Search
CPC ...... B60W 10/08; B60W 20/15; B60W 10/06; B60K 6/445
See application file for complete search history.

(56) References Cited

U.S. PATENT DOCUMENTS

2004/0231897 A1* 11/2004 Kimura ................. B60W 20/13
                                              180/65.235
2005/0099146 A1   5/2005 Nishikawa et al.

FOREIGN PATENT DOCUMENTS

| JP | 2005-151633 A | 6/2005 |
|---|---|---|
| JP | 2006-248319 A | 9/2006 |
| JP | 2006-262585 A | 9/2006 |

* cited by examiner

*Primary Examiner* — Basil T Jos
(74) *Attorney, Agent, or Firm* — Oliff PLC

(57) ABSTRACT

In an accelerator-off state, a torque command Tm1* of a first motor is set such that an engine, that is in a state in which fuel injection is stopped, is subjected to motoring by the first motor. Subsequently, torque commands Tm2* and Tm3* of a second motor and a third motor are set such that a torque of the second motor becomes equal to or less than a threshold value—Tref or equal to or more than a threshold value Tref and a hybrid vehicle runs with a required torque Td*. Then, the first motor, the second motor, and the third motor are controlled by using the torque commands Tm1*, Tm2*, and Tm3*.

4 Claims, 6 Drawing Sheets

F I G. 1
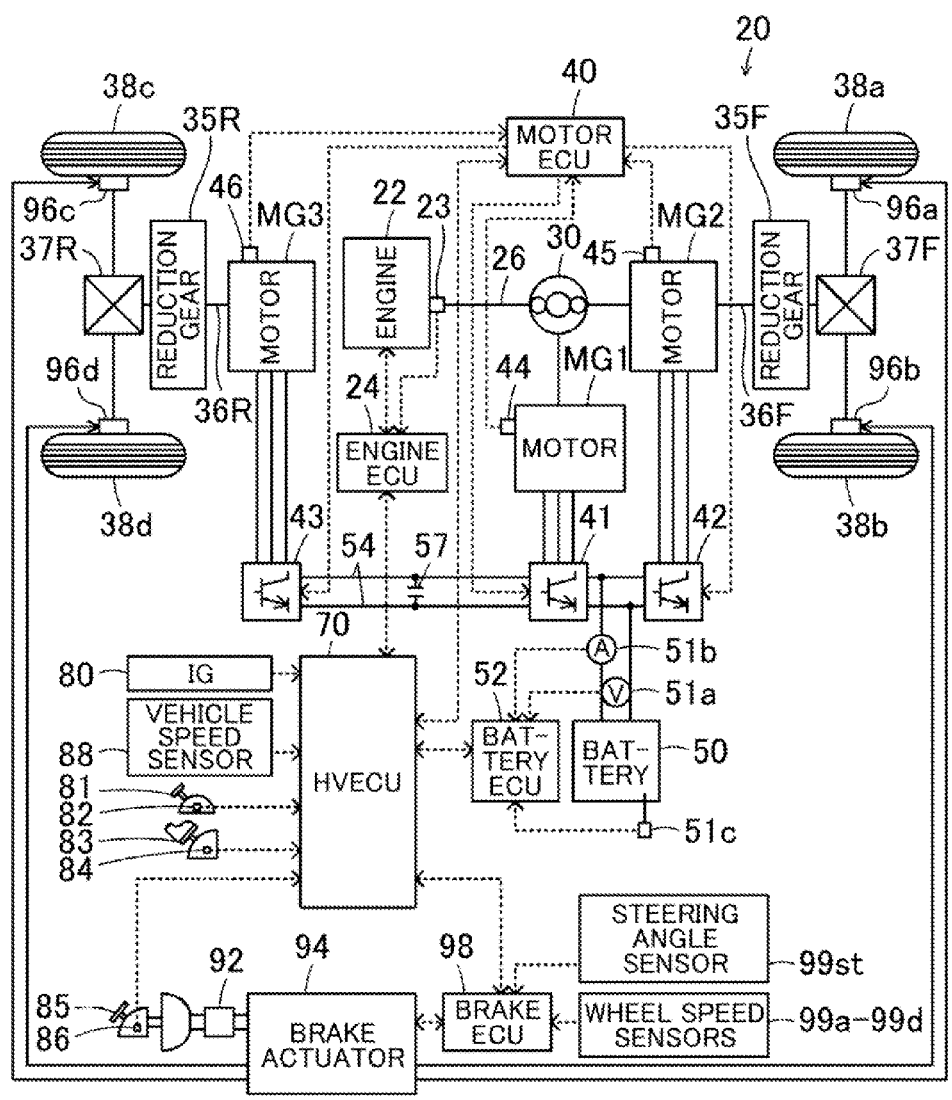

HYBRID VEHICLE

INCORPORATION BY REFERENCE

The disclosure of Japanese Patent Application No. 2014-227132 filed on Nov. 7, 2014 including the specification, drawings and abstract is incorporated herein by reference in its entirety.

BACKGROUND OF THE INVENTION

1. Field of the Invention

The invention relates to a hybrid vehicle. Specifically, the invention relates to a hybrid vehicle that includes an engine, a first motor capable of inputting and outputting power, a planetary gear connected to a first drive shaft coupled to a first axle, an output shaft of the engine, and a rotary shaft of the first motor such that three rotary elements are arranged in the order of the first drive shaft, the output shaft, and the rotary shaft in an alignment chart, a second motor capable of inputting and outputting the power to the first drive shaft, a third motor capable of inputting and outputting the power to a second drive shaft coupled to a second axle, and a battery capable of exchanging electric power with the first, second, and third motors.

2. Description of Related Art

Conventionally, as a vehicle of this type, there is proposed a vehicle that includes an engine, a first motor, a power distribution integration mechanism (planetary gear mechanism) having a ring gear, a carrier, and a sun gear that are connected to a drive shaft coupled to a front wheel, an output shaft of the engine, and a rotary shaft of the first motor, a second motor capable of inputting and outputting power to the drive shaft, a third motor capable of inputting and outputting the power to a rear wheel, and a battery capable of exchanging electric power with the first, second, and third motors (see, e.g. Japanese Patent Application Publication No. 2006-248319 (JP 2006-248319 A)). In this vehicle, in accordance with whether or not there is the occurrence of a skid, whether or not the vehicle is starting or accelerating rapidly, and whether or not the vehicle is decelerating, a rear wheel required distribution ratio as the required value of the ratio of the torque of the rear wheel to the sum of the torque of the front wheel and the torque of the rear wheel is set, the front wheel torque and the rear wheel torque are set based on the set rear wheel required distribution ratio, and the engine, the first motor, the second motor, and the third motor are controlled such that the front wheel torque is output to the front wheel and the rear wheel torque is output to the rear wheel.

SUMMARY OF THE INVENTION

In the hybrid vehicle described above, when the torque from the second motor hovers at a value 0 in the case where a braking force is caused to act on the vehicle while the engine, that is in a state in which fuel injection is stopped, is subjected to motoring by the first motor in an accelerator-off state, there are cases where a noise caused by tooth hammering occurs in the power distribution integration mechanism or the like.

The hybrid vehicle of the invention includes an engine on a first axle side, a first motor, a planetary gear, a second motor, and a third motor on a second axle side, and prevents the occurrence of a noise caused by tooth hammering in the planetary gear connected to the second motor.

A hybrid vehicle in an aspect of the invention includes: an engine; a first motor configured to receive and output power; a planetary gear connected to a first drive shaft coupled to a first axle, an output shaft of the engine, and a rotary shaft of the first motor such that three rotary elements of the planetary gear are arranged in an order of the first drive shaft, the output shaft of the engine, and the rotary shaft of the first motor in an alignment chart; a second motor configured to receive and output the power from and to the first drive shaft; a third motor configured to receive and output the power from and to a second drive shaft coupled to a second axle; a battery configured to exchange electric power with the first motor, the second motor, and the third motor; and at least one electronic control unit configured to control the first motor, the second motor, and the third motor such that, in an accelerator-off state, a) the engine, that is in a state in which fuel injection is stopped, is subjected to motoring by the first motor, b) an absolute value of a torque of the second motor becomes equal to or more than a predetermined value, and c) the hybrid vehicle runs with a required torque required for the hybrid vehicle.

In the hybrid vehicle of the invention, in the accelerator-off state, the engine in the state in which fuel injection is stopped is subjected to motoring by the first motor, the absolute value of the torque of the second motor becomes equal to or more than the predetermined value, and the first, second, and third motors are controlled such that the hybrid vehicle runs with the required torque required for the hybrid vehicle. With this, it is possible to prevent the torque of the second motor from hovering at a value 0, and prevent the occurrence of a noise caused by tooth hammering in the planetary gear and the like.

In the above aspect, the electronic control unit may be configured to control the first motor, the second motor, and the third motor such that the absolute value of the torque of the second motor becomes equal to or more than the predetermined value when a shift position is a sequential shift position and a rotational speed of the engine is increased in response to a downshift in the accelerator-off state. With this arrangement, it is possible to prevent the occurrence of the noise mentioned above from hindering creation of the increase in the rotational speed of the engine corresponding to the downshift.

In the above aspect, the electronic control unit may be configured to a) control the first motor, the second motor, and the third motor such that the first motor is driven with a first torque command, the second motor is driven with a second torque command, and the third motor is driven with a third torque command; and b) in the accelerator-off state, i) set a first drive shaft required torque and a second drive shaft required torque based on the required torque, ii) set the first torque command such that the engine rotates at a target rotational speed, iii) set a second basic torque of the second motor by using the first drive shaft required torque and a torque acting on the first drive shaft when the first motor is driven with the first torque command, iv) set a third basic torque of the third motor by using the second drive shaft required torque, and v) set the second basic torque as the second torque command and set the third basic torque as the third torque command when an absolute value of the second basic torque is not less than the predetermined value, and set a torque having an absolute value corresponding to the predetermined value as the second torque command and set the third torque command by correcting the third basic torque in accordance with a difference between the second basic torque and the second torque command when the absolute value of the second basic torque is less than the predetermined value.

In the above aspect, the electronic control unit may be configured to a) set the predetermined value as the second torque command when the second basic torque has a positive value in a case where the absolute value of the second basic torque is less than the predetermined value in the accelerator-off state, and b) set a second predetermined value obtained by inverting a sign of the predetermined value as the second torque command when the second basic torque has a negative value in the accelerator-off state. With this arrangement, as compared with the case where the predetermined value is set as the second torque command irrespective of the sign of the second basic torque and the case where the second predetermined value is set as the second torque command irrespective of the sign of the second basic torque, it is possible to prevent the second torque command and the third torque command from significantly deviating from the second basic torque and the third basic torque.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a configuration diagram showing the outline of the configuration of a hybrid vehicle as an embodiment of the invention;

DETAILED DESCRIPTION OF EMBODIMENTS

Figure 2A:
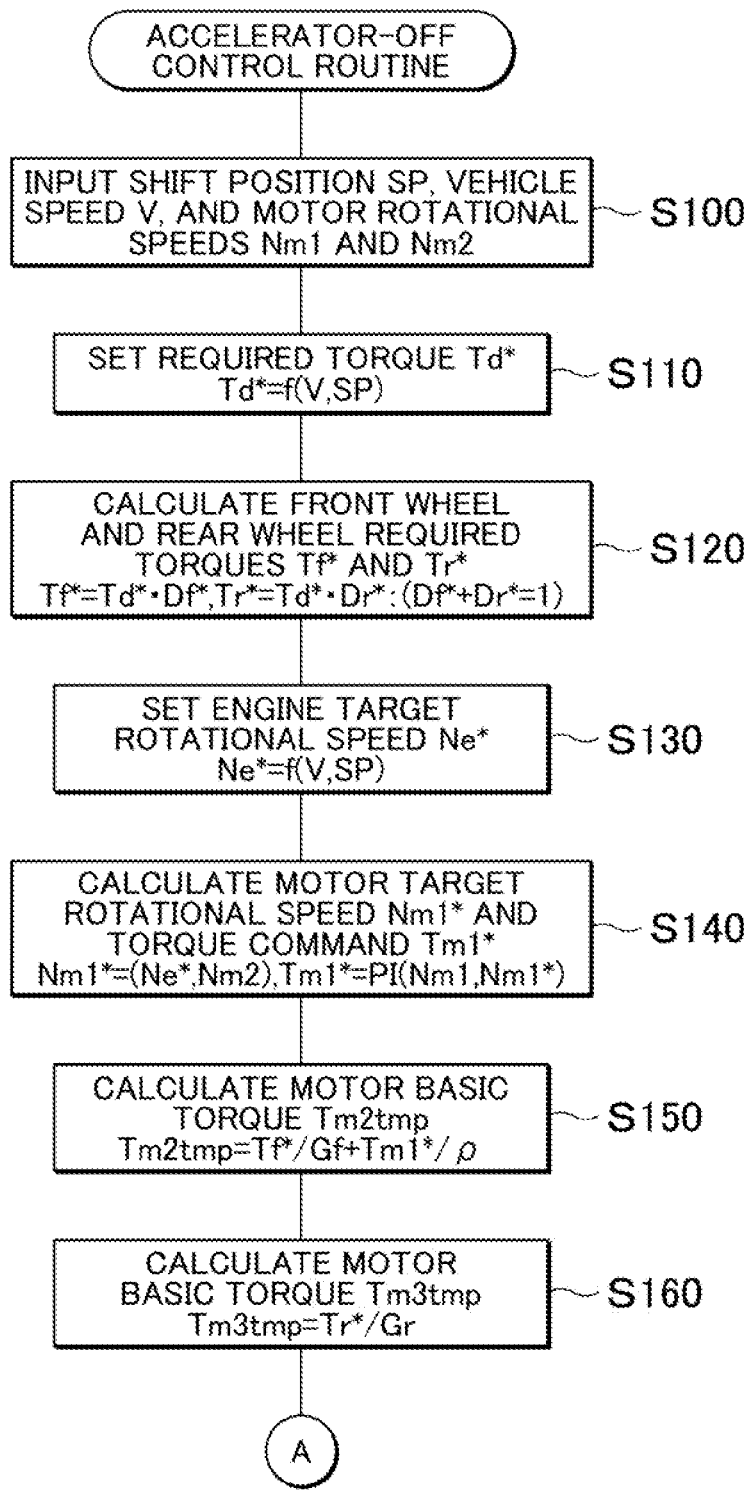
FIG. 2A is a flowchart showing an example of an accelerator-off control routine executed by a hybrid vehicle electronic control unit (HVECU) of the embodiment.

Next, a mode for carrying out the invention will be described by using an embodiment. FIG. 1 is a configuration diagram showing the outline of the configuration of a hybrid vehicle 20 as the embodiment of the invention. As shown in the drawing, the hybrid vehicle 20 of the embodiment includes an engine 22, a planetary gear 30, motors MG1, MG2, and MG3, inverters 41, 42, and 43, a battery 50, a brake actuator 94, and a hybrid electronic control unit (hereinafter referred to as an HVECU) 70.

The engine 22 is configured as an internal combustion engine that outputs power by using gasoline or light oil as fuel. The operation of the engine 22 is controlled by an engine electronic control unit (hereinafter referred to as an engine ECU) 24.

Although not shown in the drawing, the engine ECU 24 is configured as a microprocessor having a central processing unit (CPU) as a main component, and includes a read only memory (ROM) that stores a processing program, a random access memory (RAM) that temporarily stores data, input and output ports, and a communication port in addition to the CPU. To the engine ECU 24, signals from various sensors required to control the operation of the engine 22 such as, e.g., a crank angle θcr from a crank position sensor 23 that detects the rotational position of a crankshaft 26 are input via the input port. In addition, from the engine ECU 24, various control signals for controlling the operation of the engine 22 such as, e.g., a drive signal to a fuel injection value, a drive signal to a throttle motor that adjusts the position of a throttle valve, and a control signal to an ignition coil integrated with an ignitor are output via the output port. The engine ECU 24 calculates a rotational speed of the crankshaft 26, i.e., a rotational speed Ne of the engine 22 based on the crank angle θcr detected by the crank position sensor 23. The engine ECU 24 is connected to the HVECU 70 via the communication port, and the engine ECU 24 controls the operation of the engine 22 with a control signal from the HVECU 70 and outputs data on the operation state of the engine 22 to the HVECU 70 on an as-needed basis.

The planetary gear 30 is configured as a single-pinion type planetary gear mechanism. To a sun gear of the planetary gear 30, a rotor of the motor MG1 is connected. To a ring gear of the planetary gear 30, a drive shaft 36F coupled to front wheels 38a and 38b via a differential gear 37F and a reduction gear 35F is connected. To a carrier of the planetary gear 30, the crankshaft 26 of the engine 22 is connected.

The motor MG1 is configured as, e.g., a synchronous generator-motor and, as described above, the rotor thereof is connected to the sun gear of the planetary gear 30. The motor MG2 is configured as, e.g., a synchronous generator-motor, and its rotor is connected to the drive shaft 36F. The motor MG3 is configured as, e.g., a synchronous generator-motor, and a drive shaft 36R coupled to rear wheels 38c and 38d via a differential gear 37R and a reduction gear 35R is connected to the motor MG3. A motor electronic control unit (hereinafter referred to as a motor ECU) 40 performs switching control of switching elements (not shown) of the inverters 41, 42, and 43, and the motors MG1, MG2, and MG3 are thereby driven rotationally. To an electric power line 54 to which the inverters 41, 42, and 43 and the battery 50 are connected, a smoothing capacitor 57 is connected.

Although not shown in the drawing, the motor ECU 40 is configured as a microprocessor having a CPU as a main component, and includes a ROM that stores a processing program, a RAM that temporarily stores data, input and output ports, and a communication port in addition to the CPU. To the motor ECU 40, signals from various sensors required to control the drive of each of the motors MG1, MG2, and MG3 such as, e.g., rotational positions θm1, θm2, and θm3 from rotational position detection sensors 44, 45, and 46 that detect the rotational positions of the rotors of the motor MG1, MG2, and MG3, and phase currents from a current sensor that detects currents flowing in individual phases of the motors MG1, MG2, and MG3 are input via the input port. From the motor ECU 40, a switching control signal to the switching element (not shown) of each of the inverters 41, 42, and 43 is output via the output port. The motor ECU 40 calculates rotational speeds Nm1, Nm2, and Nm3 of the motors MG1, MG2, and MG3 based on the rotational positions θm1, θm2, and θm3 of the rotors of the motors MG1, MG2, and MG3 detected by the rotational position detection sensors 44, 45, and 46. The motor ECU 40 is connected to the HVECU 70 via the communication port, and the motor ECU 40 controls the drive of each of the motors MG1, MG2, and MG3 with the control signal from the HVECU 70 and outputs data on the drive states of the motors MG1, MG2, and MG3 to the HVECU 70 on an as-needed basis.

The battery 50 is configured as, e.g., a lithium-ion secondary battery or a nickel metal hydride battery, and exchanges electric power with the motors MG1, MG2, and MG3 via the inverters 41, 42, and 43. The battery 50 is managed by a battery electronic control unit (hereinafter referred to as a battery ECU) 52.

Although not shown in the drawing, the battery ECU 52 is configured as a microprocessor having a CPU as a main component, and includes a ROM that stores a processing program, a RAM that temporarily stores data, input and output ports, and a communication port in addition to the CPU. To the battery ECU 52, signals required to manage the battery 50 such as, e.g., a battery voltage VB from a voltage sensor 51a disposed between terminals of the battery 50, a battery current IB from a current sensor 51b mounted to an output terminal of the battery 50, and a battery temperature TB from a temperature sensor 51c mounted to the battery 50 are input via the input port. The battery ECU 52 calculates an accumulated charge ratio SOC as a ratio of the capacity of electric power that can be discharged from the battery 50 to the total capacity based on an integrated value of the battery current IB detected by the current sensor 51b. The battery ECU 52 is connected to the HVECU 70 via the communication port, and outputs data on the state of the battery 50 to the HVECU 70 on an as-needed basis.

The brake actuator 94 is configured as an actuator for giving a braking force to the front wheels 38a and 38b and the rear wheels 38c and 38d. Specifically, the brake actuator 94 is configured to be capable of setting the braking force caused to act on the vehicle in accordance with the pressure (brake pressure) of a master cylinder 92 generated in response to depression of a brake pedal 85 and a vehicle speed V, and adjusting the hydraulic pressure of each of brake wheel cylinders 96a, 96b, 9c, and 96d such that part of the above braking force corresponding to the share of the brake acts on the front wheels 38a and 38b and the rear wheels 38c and 38d or such that the braking force acts on the front wheels 38a and 38b and the rear wheels 38c and 38d irrespective of the depression of the brake pedal 85. The drive of the brake actuator 94 is controlled by a brake electronic control unit (hereinafter referred to as a brake ECU) 98.

Although not shown in the drawing, the brake ECU 98 is configured as a microprocessor having a CPU as a main component, and includes a ROM that stores a processing program, a RAM that temporarily stores data, input and output ports, and a communication port in addition to the CPU. To the brake ECU 98, signals from various sensors required to control the drive of the brake actuator 94 such as, e.g., a master cylinder pressure (brake depression force Fb) detected by a pressure sensor (not shown) mounted to the master cylinder 92, wheel speeds Vwa to Vwd from wheel speed sensors 99a to 99d mounted to the front wheels 38a and 38b and the rear wheels 38c and 38d, and a steering angle θst from a steering angle sensor 99st are input via the input port. From the brake ECU 98, a drive control signal to the brake actuator 94 or the like is output via the output port. The brake ECU 98 is connected to the HVECU 70 via the communication port, and controls the drive of the brake actuator 94 with the control signal from the HVECU 70 and outputs data on the state of the brake actuator 94 to the HVECU 70 on an as-needed basis. The brake ECU 98 receives signals such as the wheel speeds Vwa to Vwd of the front wheels 38a and 38b and the rear wheels 38c and 38d from the wheel speed sensors 99a to 99d and the steering angle θst from the steering angle sensor 99st, and performs vehicle behavior stabilization control such as an anti-lock brake system (ABS) that prevents any of the front wheels 38a and 38b and the rear wheels 38c and 38d from skidding due to lock when a driver depresses the brake pedal 85, traction control (TRC) that prevents any of the front wheels 38a and 38b from skidding due to spinning when the driver depresses an accelerator pedal 83, or vehicle stability control (VSC) that holds an attitude during cornering of the vehicle.

Although not shown in the drawing, the HVECU 70 is configured as a microprocessor having a CPU as a main component, and includes a ROM that stores a processing program, a RAM that temporarily stores data, input and output ports, and a communication port in addition to the CPU. To the HVECU 70, an ignition signal from an ignition switch 80, a shift position SP from a shift position sensor 82 that detects an operation position of a shift lever 81, an accelerator depression amount Acc from an accelerator pedal position sensor 84 that detects the depression amount of the accelerator pedal 83, a brake pedal position BP from a brake pedal position sensor 86 that detects the depression amount of the brake pedal 85, and the vehicle speed V from a vehicle speed sensor 88 are input via the input port. As described above, the HVECU 70 is connected to the engine ECU 24, the motor ECU 40, and the battery ECU 52 via the communication port, and exchanges various control signals and data with the engine ECU 24, the motor ECU 40, and the battery ECU 52.

The thus configured hybrid vehicle 20 of the embodiment runs in a hybrid running mode (HV running mode) in which the hybrid vehicle runs with the operation of the engine 22 and an electric running mode (EV running mode) in which the hybrid vehicle runs in a state in which the operation of the engine 22 is stopped.

In the hybrid vehicle 20 of the embodiment, as the shift position SP of the shift lever 81, a sequential shift position (S position) having an upshift command position and a downshift command position is prepared in addition to a parking position (P position) that is used during parking, a reverse position (R position) for reverse running, a neutral position (N position), and a normal drive position (D position) for forward running Herein, the S position is the position that switches the driving force in an accelerator-on state and the braking force in an accelerator-off state during running to, e.g., six stages (S1 to S6). Specifically, every time an upshift is performed in response to the operation of the upshift command position, the driving force in the accelerator-on state and the braking force in the accelerator-off state during running are reduced. In addition, every time a downshift is performed in response to the operation of the downshift command position, the driving force in the accelerator-on state and the braking force in the accelerator-off state during running are increased. With this, when the shift position SP is the S position, it is possible to give a driver a gear shifting feeling by a virtual stepped transmission instead of the gear shifting feeling by the operation of the shift lever 81.

Figure 2B:
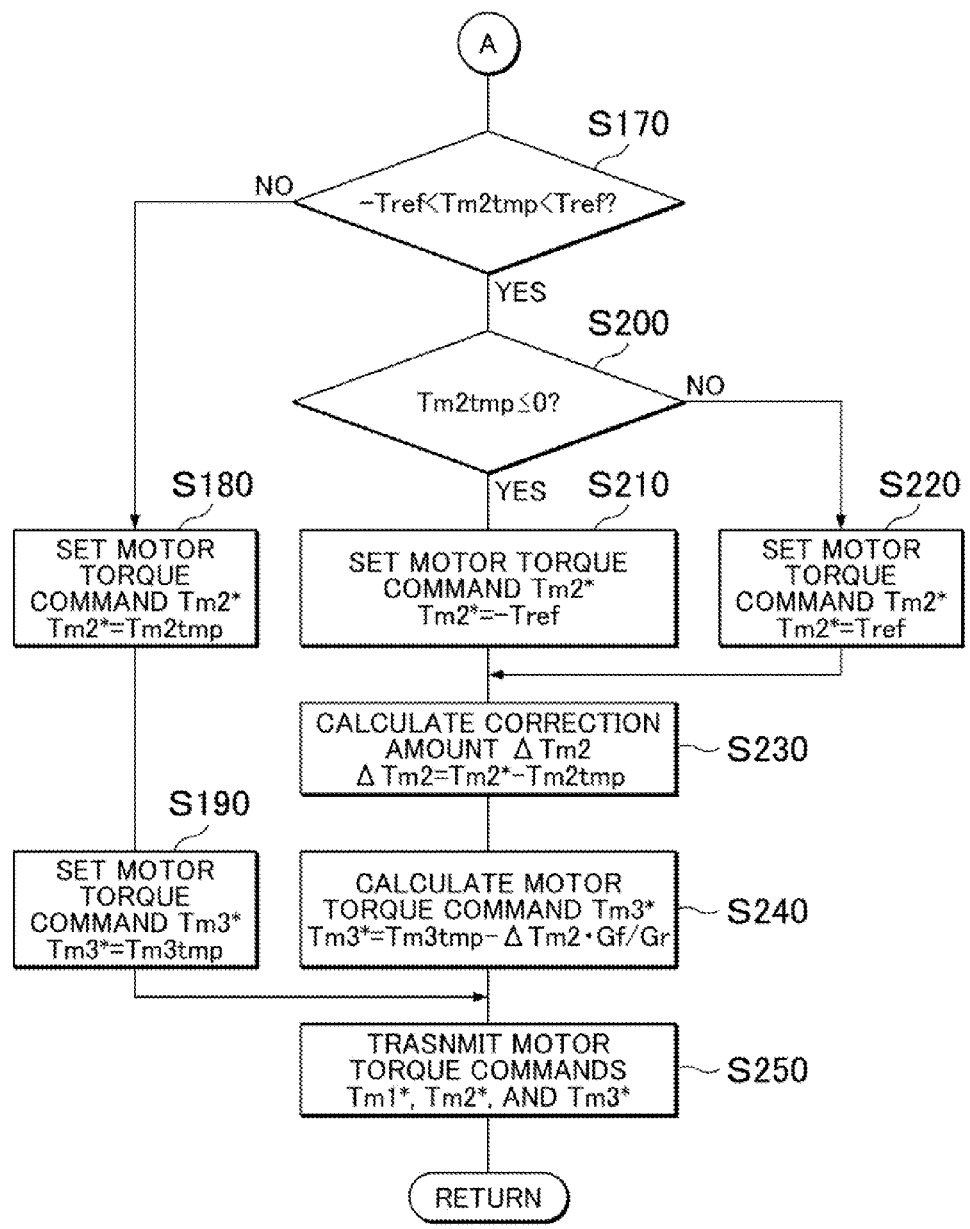
FIG. 2B is a flowchart showing an example of an accelerator-off control routine executed by a hybrid vehicle electronic control unit (HVECU) of the embodiment.

Next, the operation of the thus configured hybrid vehicle 20 of the embodiment, particularly the operation thereof in the accelerator-off state will be described. FIG. 2A and 2B is a flowchart showing an example of an accelerator-off control routine executed by the HVECU 70 of the embodiment. This routine is repeatedly executed every predetermined time (e.g., every several msec) in the accelerator-off state.

When the accelerator-off control routine is executed, data such as the shift position SP, the vehicle speed V, and the rotational speeds Nm1 and Nm2 of the motors MG1 and MG2 is input to the HVECU 70 first (step S100). Herein, it is assumed that a value detected by the shift position sensor 82 is input as the shift position SP. In addition, it is assumed that a value detected by the vehicle speed sensor 88 is input as the vehicle speed V. Further, it is assumed that values calculated based on the rotational positions θm1 and θm2 of the rotors of the motors MG1 and MG2 detected by the rotational position detection sensors 44 and 45 are input from the motor ECU 40 through communications as the rotational speeds Nm1 and Nm2 of the motors MG1 and MG2.

Figure 3:
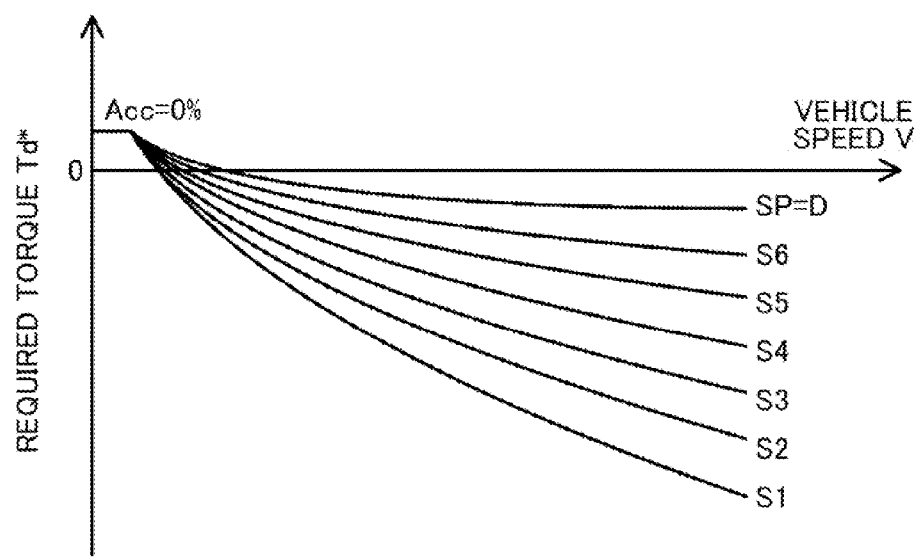
FIG. 3 is an explanatory view showing an example of a required torque setting map.

When the data is input in this manner, based on the input vehicle speed V and the input shift position SP, a required torque Td* that is required for the vehicle is set (step S110). In the embodiment, with regard to the required torque Td*, it is assumed that a relationship among the vehicle speed V, the shift position SP, and the required torque Td* is determined in advance and stored in the ROM (not shown) as a required torque setting map and, when the vehicle speed V and the shift position SP are given, the corresponding required torque Td* is derived from the stored map and set. An example of the required torque setting map is shown in FIG. 3. Note that, in the case where the required torque Td* is negative, that means that a braking torque is required.

Subsequently, as shown in the following expressions (1) and (2), by multiplying the required torque Td* by a front wheel required distribution ratio Df* and a rear wheel required distribution ratio Dr*, a front wheel required torque Tf* and a rear wheel required torque Tr* that are required for the front wheels 38a and 38b and the rear wheels 38c and 38d are calculated (step S120). Herein, the front wheel required distribution ratio Df* and the rear wheel required distribution ratio Dr* are a required value of the ratio of the torque of the front wheels 38a and 38b and a required value of the ratio of the torque of the rear wheels 38c and 38d to the sum of the torque of the front wheels 38a and 38b and the torque of the rear wheels 38c and 38d. In addition, the sum of the front wheel required distribution ratio Df* and the rear wheel required distribution ratio Dr* is 1. In the embodiment, it is assumed that, as the front wheel required distribution ratio Df* and the rear wheel required distribution ratio Dr*, values that allow sufficient stability of the running attitude of the vehicle in the accelerator-off state are determined by experiments and analysis and are used. In the front wheel required distribution ratio Df* and the rear wheel required distribution ratio Dr*, it is possible to use, e.g., predetermined values Df1 and Dr1 (Df1+Dr1=1) corresponding to a barycentric position (static load barycentric position) when the vehicle stops. Note that, as the predetermined value Dr1, in the case where the front side of the vehicle is slightly heavier than the rear side thereof (in the case where a load acting on the front wheels 38a and 38b is slightly larger than a load acting on the rear wheels 38c and 38d), it is possible to use, e.g., values 0.55, 0.6, and 0.65.

$$Tf^* = Td^* \cdot Df^* \quad (1)$$

$$Tr^* = Td^* \cdot Dr^* \quad (2)$$

Figure 4:
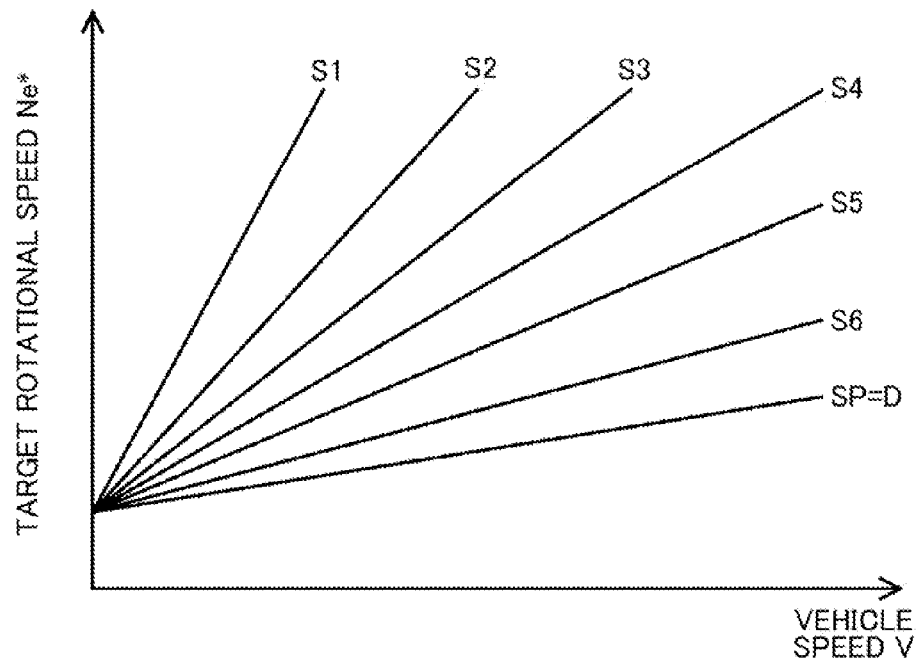
FIG. 4 is an explanatory view showing an example of a target rotational speed setting map.

Next, based on the vehicle speed V and the shift position SP, a target rotational speed Ne* of the engine 22 when the engine 22 in a state in which fuel injection is stopped (fuel is cut) is forced to rotate by motoring by the motor MG1 is set (step S130). In the embodiment, it is assumed that, with regard to the target rotational speed Ne* of the engine 22, a relationship among the vehicle speed V, the shift position SP, and the target rotational speed Ne* of the engine 22 is determined in advance and stored in the ROM (not shown) and, when the vehicle speed V and the shift position SP are given, the corresponding target rotational speed Ne* of the engine 22 is derived from a stored map and is set. An example of the target rotational speed setting map is shown in FIG. 4. The target rotational speed Ne* of the engine 22 is determined so as to operate like engine braking of a vehicle having a manual transmission. Specifically, as shown in the drawing, the target rotational speed Ne* of the engine 22 is determined so as to be higher as the vehicle speed V is higher, is determined so as to be higher when the shift position SP is the S position than when the shift position SP is the D position, and is determined so as to be higher as the stage number (S6 to S1) is lower when the shift position SP is the S position.

Figure 5:
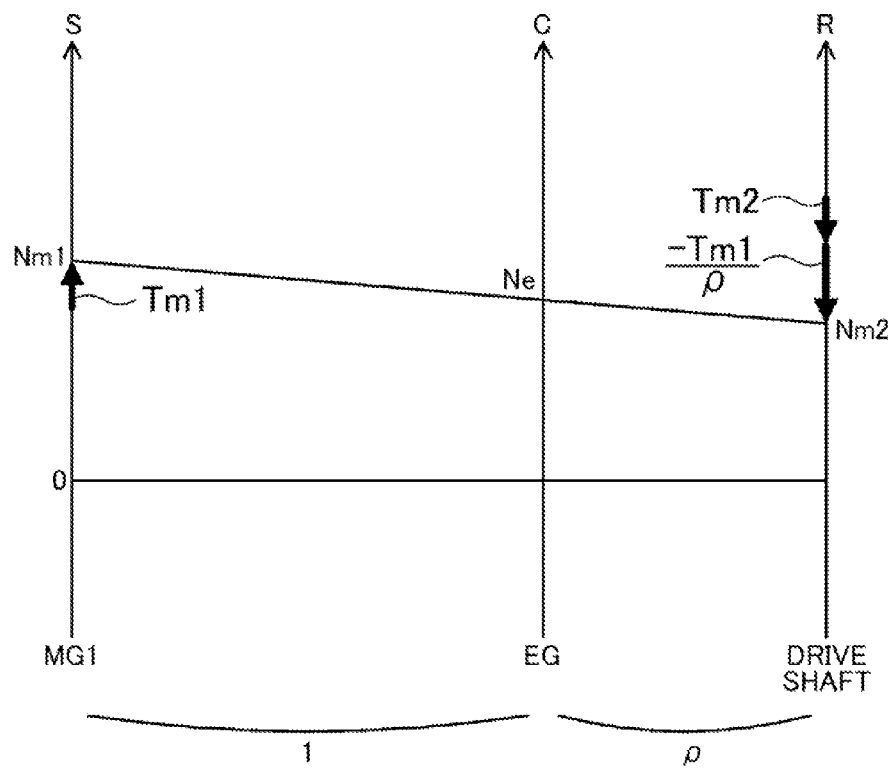
FIG. 5 is an explanatory view showing an example of an alignment chart that shows a dynamic relationship between a rotational speed and a torque in a rotary element of a planetary gear when an engine, that is in a state in which fuel injection is stopped, is subjected to motoring by a motor MG1.

When the target rotational speed Ne* of the engine 22 is set in this manner, a target rotational speed Nm1* of the motor MG1 is calculated by the following expression (3) by using the target rotational speed Ne* of the engine 22, the rotational speed Nm2 of the motor MG2 (the rotational speed of the drive shaft 36F), and a gear ratio ρ of the planetary gear 30, and a torque command Tm1* of the motor MG1 is calculated by the following expression (4) by using the calculated target rotational speed Nm1* and the current rotational speed Nm1 of the motor MG1 (step S140). Herein, the expression (3) is a dynamic relational expression to the rotary element of the planetary gear 30. FIG. 5 is an explanatory view showing an example of an alignment chart showing a dynamic relationship between the rotational speed and the torque in the rotary element of the planetary gear 30 when the engine 22 in the state in which the fuel injection is stopped is subjected to motoring by the motor MG1. In the drawing, the S axis on the left indicates the rotational speed of the sun gear as the rotational speed Nm1 of the motor MG1, the C axis indicates the rotational speed of the carrier as the rotational speed Ne of the engine 22, and the R axis indicates the rotational speed of a ring gear (the drive shaft 36F) as the rotational speed Nm2 of the motor MG2. In addition, two thick arrows on the R axis indicate a torque that is output from the motor MG1 for motoring of the engine 22 and acts on the drive shaft 36F via the planetary gear 30, and a torque that is output from the motor MG2 and acts on the drive shaft 36F. The expression (3) can be easily derived by using this alignment chart. Further, the expression (4) is a relational expression in feedback control for rotating the motor MG1 at the target rotational speed Nm1* (rotating the engine 22 at the target rotational speed Ne*). In the expression (4), the first term on the right side is a feedforward term, and the second term and the third term on the right side are a proportional term and an integration term of a feedback term. In addition, in the expression (4), "kp" as the second term on the right side is a gain of the proportional term, and "ki" as the third term on the right side is a gain of the integration term.

$$Nm1^* = Ne^* \cdot (1+\rho)/\rho - Nm2/\rho \quad (3)$$

$$Tm1^* = kp \cdot (Nm1^* - Nm1) + ki \cdot \int (Nm1^* - Nm1) dt \quad (4)$$

Subsequently, as shown in the following expression (5), a basic torque Tm2tmp as a basic value of a torque command Tm2* of the motor MG2 is calculated by adding a value obtained by dividing the torque command Tm1* of the motor MG1 by the gear ratio ρ of the planetary gear 30 to a value obtained by dividing the front wheel requested torque Tf* by a gear ratio Gf of the reduction gear 35F (Tf*/Gf) (step S150). Then, as shown in the following expression (6), a value obtained by dividing the rear wheel required torque Tr* by a gear ratio Or of the reduction gear 35R (Tr*/Gr) is set as a basic torque Tm3tmp as a basic value of a torque command Tm3* of the motor MG3 (step S160). Herein, the expression (5) can be easily derived by using the alignment chart in FIG. 5. The values (Tf*/Of) and (Tr*/Gr) mean torques that are required for the drive shafts 36F and 36R.

$$Tm2tmp = Tf^*/Gf + Tm1^*/\rho \quad (5)$$

$$Tm3tmp = Tr^*/Gr \quad (6)$$

Next, the basic torque Tm2tmp of the motor MG2 is compared with threshold values Tref and −Tref (step S170). Herein, the threshold values Tref and −Tref are used for determining whether or not the basic torque Tm2tmp of the motor MG2 is in the vicinity of a value 0, and absolute values thereof are slightly larger than upper and lower limits of a torque range in which a noise caused by tooth hammering can occur in the planetary gear 30 and the reduction gear 35F when the motor MG2 is driven with the basic torque Tm2tmp. As the threshold value Tref, it is possible to use, e.g., 3 Nm and 5 Nm. When the torque of the motor MG2 hovers at the value 0, there are cases where the noise caused by tooth hammering occurs in the planetary gear 30 and the reduction gear 35F connected to the motor MG2. The process in step S170 is the process that determines whether or not the noise can occur.

When the basic torque Tm2tmp of the motor MG2 is not more than the threshold value −Tref or not less than the threshold value Tref, it is determined that the noise caused by tooth hammering does not occur in the planetary gear 30 or the reduction gear 35F, and the basic torque Tm2tmp of the motor MG2 is set as the torque command Tm2* of the motor MG2 (step S180), and the basic torque Tm3tmp of the motor MG3 is set as the torque command Tm3* of the motor MG3 (step S190). Subsequently, the set torque commands Tm1*, Tm2*, and Tm3* of the motors MG1, MG2, and MG3 are transmitted to the motor ECU 40 (step S250), and the present routine is ended. The motor ECU 40 having received the torque commands Tm1*, Tm2*, and Tm3* of the motors MG1, MG2, and MG3 performs the switching control of the switching elements of the inverters 41, 42, and 43 such that the motors MG1, MG2, and MG3 are driven with the torque commands Tm1*, Tm2*, and Tm3*. With this control, the hybrid vehicle can run with the required torque Td*. In addition, the motors MG1, MG2, and MG3 are controlled by using the torque commands Tm1*, Tm2*, and Tm3* of the motors MG1, MG2, and MG3 corresponding to the front wheel required distribution ratio Df* and the rear wheel required distribution ratio Dr* described above, and hence it is possible to secure sufficient stability of the running attitude of the vehicle in the accelerator-off state.

When the basic torque Tm2tmp of the motor MG2 is more than the threshold value −Tref and less than the threshold value Tref in step S170, it is determined that the noise caused by tooth hammering can occur in the planetary gear 30 and the reduction gear 35F in the case where the motor MG2 is driven with the basic torque Tm2tmp. Then, the basic torque Tm2tmp of the motor MG2 is compared with the value 0 (step S200).

Subsequently, when the basic torque Tm2tmp of the motor MG2 is not more than the value 0, the threshold value −Tref is set as the torque command Tm2* of the motor MG2 (step S210). On the other hand, when the basic torque Tm2tmp of the motor MG2 is more than the value 0, the threshold value Tref is set as the torque command Tm2* of the motor MG2 (step S220).

When the torque command Tm2* of the motor MG2 is set in this manner, as shown in the following expression (7), a correction amount ΔTm2 resulting from the change of the torque command Tm2* of the motor MG2 from the basic torque Tm2tmp to the threshold value −Tref or the threshold value Tref is calculated by subtracting the basic torque Tm2tmp from the torque command Tm2* of the motor MG2 (step S230). When the correction amount ΔTm2 is calculated in this manner, as shown in the following expression (8), the torque command Tm3* of the motor MG3 is calculated by subtracting the product of the calculated correction amount ΔTm2 and a value (Gf/Gr) obtained by dividing the gear ratio Gf of the reduction gear 35F by the gear ratio Or of the reduction gear 35R from the basic torque Tm3tmp of the motor MG3 (step S240). Subsequently, the set torque commands Tm1*, Tm2*, and Tm3* of the motors MG1, MG2, and MG3 are transmitted to the motor ECU 40 (step S250), and the present routine is ended. Herein, the product of the value (Gf/Gr) and the correction amount ΔTm2 means a value obtained by converting the correction amount ΔTm2 into the torque of the rotary shaft (the drive shaft 36R) of the motor MG3.

$$\Delta Tm2 = Tm2^* - Tm2tmp \quad (7)$$

$$Tm3^* = Tm3tmp - \Delta Tm2 \cdot Gf/Gr \quad (8)$$

Thus, in the embodiment, when the basic torque Tm2tmp of the motor MG2 is more than the threshold value −Tref and less than the threshold value Tref, the motor MG2 is controlled by setting the threshold value −Tref or the threshold value Tref as the torque command Tm2* of the motor MG2. With this, it is possible to prevent the torque of the motor MG2 from hovering at the value 0. As a result, it is possible to prevent the occurrence of the noise caused by tooth hammering in the planetary gear 30 and the reduction gear 35F. In addition, in the embodiment, the torque command Tm3* of the motor MG3 is set by the above expressions (7) and (8). With this, the hybrid vehicle can run with the required torque Td*. Further, in the embodiment, when the basic torque Tm2tmp is not more than the value 0 and more than the threshold value −Tref, the threshold value −Tref is set as the torque command Tm2* of the motor MG2 and, when the basic torque Tm2tmp is more than the value 0 and less than the threshold value Tref, the threshold value Tref is set as the torque command Tm2* of the motor MG2. Consequently, it is possible to prevent the absolute value of the correction amount ΔTm2 from increasing as compared with the case where the threshold value −Tref is set as the torque command Tm2* irrespective of the sign of the basic torque Tm2tmp, and the case where the threshold value Tref is set as the torque command Tm2* irrespective of the sign of the basic torque Tm2tmp. With this, it is possible to prevent the torque command Tm2* and the torque command Tm3* from significantly deviating from the basic torque Tm2tmp and the basic torque Tm3tmp. In addition, it is possible to prevent the ratio of the torque (−Tm1*/ρ+Tm2*)·Gf to the sum of the torque (−Tm1*/ρ+Tm2*)·Gf of the front wheels 38a and 38b and the torque Tm3*·Gr of the rear wheels 38c and 38d from significantly deviating from the front wheel required distribution ratio Df*. Further, it is possible to prevent the ratio of the torque Tm3*·Gr to the torque ((−Tm1*/ρ+Tm2*)·Gf+Tm3*·Gr) from significantly deviating from the rear wheel required distribution ratio Dr*. As a result, it is possible to prevent a reduction in the stability of the running attitude of the vehicle in the accelerator-off state.

Figure 6:
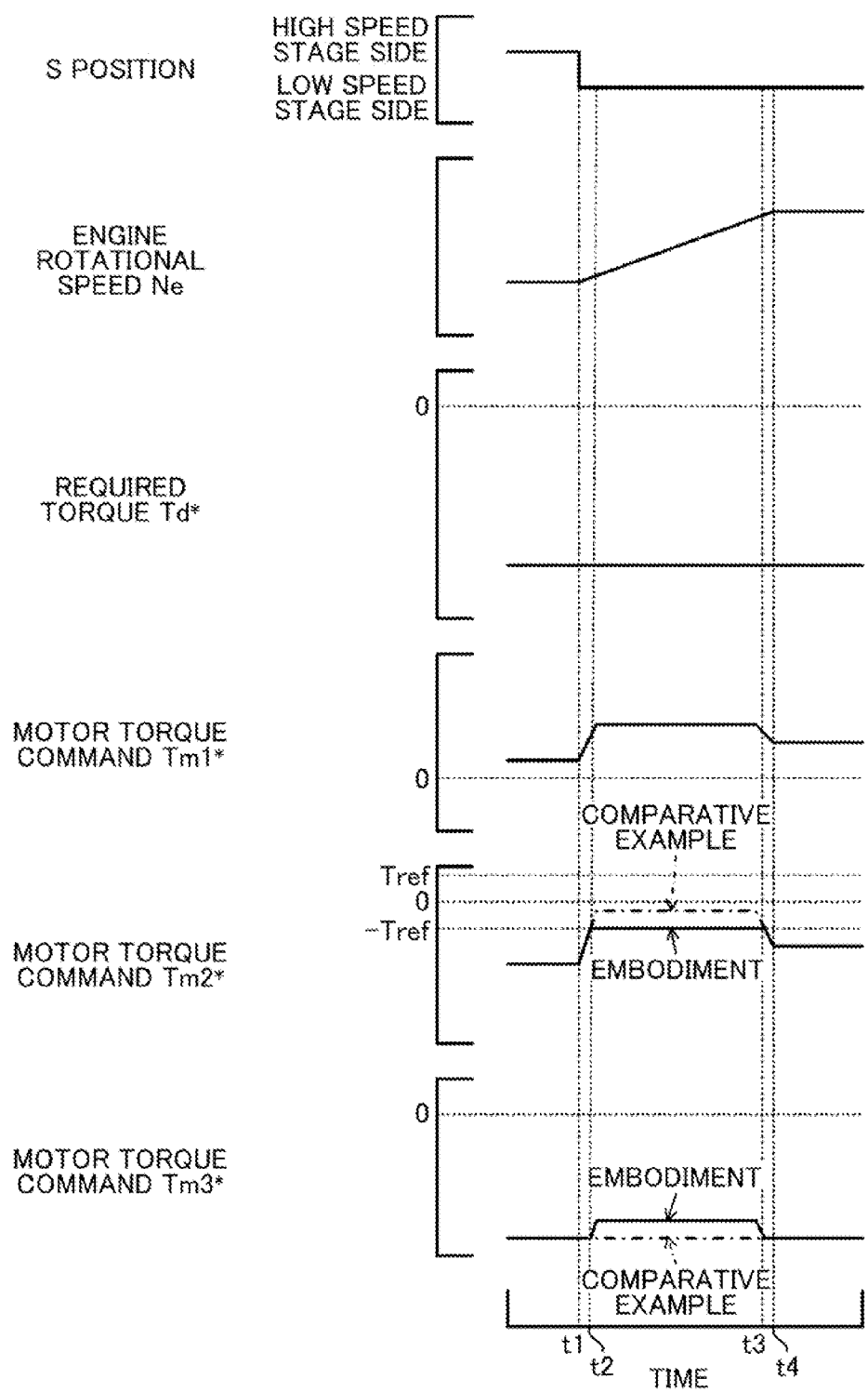
FIG. 6 is an explanatory view showing an example of a state of a temporal change of each of a rotational speed Ne of an engine, and torque commands Tm1*, Tm2*, and Tm3* of motors MG1, MG2, and MG3 when a shift position SP is an S position and the rotational speed Ne of the engine is increased in response to a downshift in an accelerator-off state.

FIG. 6 is an explanatory view showing an example of a state of a temporal change of each of the rotational speed Ne of the engine 22, and the torque commands Tm1*, Tm2*, and Tm3* of the motors MG1, MG2, and MG3 when the shift position SP is the S position, and the rotational speed Ne of the engine 22 is increased in response to the downshift (e.g., changing from S4 to S3) in the accelerator-off state. In the drawing, a solid line indicates the state of the embodiment, and a one-dot chain line indicates the state of a comparative example. Herein, as the comparative example, the case where the basic torques Tm2tmp and Tm3tmp of the motors MG2 and MG3 are set as the torque commands Tm2* and Tm3* of the motors MG2 and MG3 irrespective of the value of the basic torque Tm2tmp of the motor MG2 is studied. In addition, after the downshift, the value of the required torque Td* is actually changed from the value thereof before the downshift in the embodiment and the comparative example (see FIG. 3) but, in FIG. 6, the value thereof before the downshift is made the same as that after the downshift, for simplification. Further, although not described in detail in the above description of the routine in FIG. 2A and 2B, in FIG. 6, when the downshift is performed with the shift position SP at the S position in the accelerator-off state (e.g., changed from S4 to S3), the rotational speed Ne of the engine 22 is gradually changed by gradually changing the target rotational speed Ne* of the engine 22 from the value before the downshift (e.g., a value at S4) to the value after the downshift (e.g., a value at S3). With this, the downshift feeling by the increase in the rotational speed Ne of the engine 22 is created.

In the embodiment and the comparative example, when the downshift is performed at time t1, the torque command Tm1* of the motor MG1 is increased in order to increase the rotational speed Ne of the engine 22, and the torque command Tm2* of the motor MG2 is increased so as to satisfy the front wheel required torque Tf* (reduced as a value on a braking side). The torque command Tm2* of the motor MG2 is increased because the torque acting on the drive shaft 36F via the planetary gear 30 from the motor MG1 is reduced with the increase in the torque command Tm1* of the motor MG1 (increased as the value on the braking side). Thereafter, when the rotational speed Ne of the engine 22 approaches the target rotational speed Ne* after the downshift, the torque command Tm1* of the motor MG1 is reduced (caused to approach the torque for motoring of the engine 22 at the target rotational speed Ne* after the downshift), and the torque command Tm2* of the motor MG2 is reduced (increased as the value on the braking side). Subsequently, the rotational speed Ne of the engine 22 reaches the target rotational speed Ne* after the downshift at time t4, and the change of the rotational speed Ne of the engine 22 corresponding to the downshift is ended.

In the case of the comparative example, as indicated by the one-dot chain line in the drawing, during a time period from time t1 to time t4, the torque command Tm2* of the motor MG2 is more than the threshold value −Tref and less than the threshold value Tref from time t2 to time t3. Accordingly, the torque of the motor MG2 hovers at the value 0, and the noise caused by tooth hammering can occur in the planetary gear 30 and the reduction gear 35F. In contrast to this, in the case of the embodiment, as indicated by the solid line in the drawing, the torque command Tm2* of the motor MG2 is equal to the threshold value −Tref from time t2 to time t3. With this, it is possible to prevent the torque of the motor MG2 from hovering at the value 0, and prevent the occurrence of the noise caused by tooth hammering in the planetary gear 30 and the reduction gear 35F. In particular, in the case of the embodiment in FIG. 6, the occurrence of the noise caused by tooth hammering is prevented in the planetary gear 30 and the reduction gear 35F while the rotational speed Ne of the engine 22 is increased in response to the downshift, and hence it is possible to prevent the noise from hindering the creation of the increase in the rotational speed Ne of the engine 22 corresponding to the downshift.

In the hybrid vehicle 20 of the embodiment described above, in the accelerator-off state, the engine 22 in the state in which the fuel injection is stopped is subjected to motoring by the motor MG1, the torque of the motor MG2 becomes equal to or less than the threshold value −Tref or equal to or more than the threshold value Tref, and the motors MG1, MG2, and MG3 are controlled such that the hybrid vehicle runs with the required torque Td*. With this, it is possible to prevent the torque of the motor MG2 from hovering at the value 0, and prevent the occurrence of the noise caused by tooth hammering in the planetary gear 30 and the reduction gear 35F.

In the hybrid vehicle 20 of the embodiment, when the basic torque Tm2tmp of the motor MG2 is more than the threshold value −Tref and less than the threshold value Tref, the threshold value −Tref is set as the torque command Tm2* of the motor MG2 in the case where the basic torque Tm2tmp is not more than the value 0, and the threshold value Tref is set as the torque command Tm2* of the motor MG2 in the case where the basic torque Tm2tmp is more than the value 0. However, the threshold value −Tref may also be set as the torque command Tm2* of the motor MG2 irrespective of whether or not the basic torque Tm2tmp of the motor MG2 is not more than the value 0. In addition, the threshold value Tref may also be set as the torque command Tm2* of the motor MG2 irrespective of whether or not the basic torque Tm2tmp of the motor MG2 is not more than the value 0.

In the hybrid vehicle 20 of the embodiment, when the basic torque Tm2tmp of the motor MG2 is more than the threshold value −Tref and less than the threshold value Tref, the threshold value −Tref or the threshold value Tref is set as the torque command Tm2* of the motor MG2. However, the torque having an absolute value slightly larger than the absolute value of the threshold value −Tref or the threshold value Tref may also be set as the torque command Tm2* of the motor MG2.

In the hybrid vehicle 20 of the embodiment, the drive shaft 36F is coupled to the front wheels 38a and 38b via the reduction gear 35F, and the drive shaft 36R is coupled to the rear wheels 38c and 38d via the reduction gear 35R. However, the drive shaft 36F may also be coupled to the front wheels 38a and 38b without the intervention of the reduction gear 35F. In addition, the drive shaft 36F may also be coupled to the front wheels 38a and 38b via a transmission instead of the reduction gear 35F. Further, the drive shaft 36R may also be coupled to the rear wheels 38c and 38d without the intervention of the reduction gear 35R. Additionally, the drive shaft 36R may also be coupled to the rear wheels 38c and 38d via the transmission instead of the reduction gear 35R.

A correspondence between the main elements of the embodiment and the main elements of the invention described in the section of SUMMARY OF THE INVENTION will be described. In the embodiment, the engine 22 corresponds to the "engine", the motor MG1 corresponds to the "first motor", the planetary gear 30 corresponds to the "planetary gear", the motor MG2 corresponds to the "second motor", the motor MG3 corresponds to the "third motor", the battery 50 corresponds to the "battery", and the HVECU 70 that executes the accelerator-off control routine in FIG. 2A and 2B and the motor ECU 40 that controls the motors MG1, MG2, and MG3 based on the torque commands Tm1*, Tm2*, and Tm3* of the motors MG1, MG2, and MG3 from the HVECU 70 correspond to the "electronic control unit".

Note that the correspondence between the main elements of the embodiment and the main elements of the invention described in the section of SUMMARY OF THE INVENTION is an example for the embodiment to specifically describe the mode for carrying out the invention described in the section of SUMMARY OF THE INVENTION, and hence the correspondence therebetween is not intended to limit the elements of the invention described in SUMMARY OF THE INVENTION. That is, the invention described in the section of SUMMARY OF THE INVENTION should be interpreted based on the description in the section of SUMMARY OF THE INVENTION, and the embodiment is merely a specific example of the invention described in the section of SUMMARY OF THE INVENTION.

Thus, the mode for carrying out the invention has been described by using the embodiment, but the invention is not limited to the embodiment, and it is obvious that the invention can be implemented in various forms without departing from the scope of the invention.

The invention is usable in, for example, a hybrid vehicle manufacturing industry.

What is claimed is:
1. A hybrid vehicle comprising:
   an engine;
   a first motor configured to receive and output power;
   a planetary gear connected to a first drive shaft coupled to a first axle, an output shaft of the engine, and a rotary shaft of the first motor such that three rotary elements of the planetary gear are arranged in an order of the first drive shaft, the output shaft of the engine, and the rotary shaft of the first motor in an alignment chart;
   a second motor configured to receive and output power from and to the first drive shaft;
   a third motor configured to receive and output power from and to a second drive shaft coupled to a second axle;
   a battery configured to exchange electric power with the first motor, the second motor, and the third motor; and
   at least one electronic control unit configured to control the first motor, the second motor, and the third motor such that, in an accelerator-off state,
   a) the engine, that is in a state in which fuel injection is stopped, is subjected to motoring by the first motor,
   b) an absolute value of a torque of the second motor becomes equal to or more than a predetermined value, and
   c) the hybrid vehicle runs with a required torque required for the hybrid vehicle.

2. The hybrid vehicle according to claim 1, wherein the electronic control unit is configured to control the first motor, the second motor, and the third motor such that the absolute value of the torque of the second motor becomes equal to or more than the predetermined value when a shift position is a sequential shift position and a rotational speed of the engine is increased in response to a downshift in the accelerator-off state.

3. The hybrid vehicle according to claim 1, wherein the electronic control unit is configured to
   a) control the first motor, the second motor, and the third motor such that the first motor is driven with a first torque command, the second motor is driven with a second torque command, and the third motor is driven with a third torque command; and
   b) in the accelerator-off state,
      i) set a first drive shaft required torque and a second drive shaft required torque based on the required torque,
      ii) set the first torque command such that the engine rotates at a target rotational speed,
      iii) set a second basic torque of the second motor by using the first drive shaft required torque and a torque acting on the first drive shaft when the first motor is driven with the first torque command,
      iv) set a third basic torque of the third motor by using the second drive shaft required torque, and
      v) set the second basic torque as the second torque command and set the third basic torque as the third torque command when an absolute value of the second basic torque is equal to or larger than the predetermined value, and set a torque having an absolute value corresponding to the predetermined value as the second torque command and set the third torque command by correcting the third basic torque in accordance with a difference between the second basic torque and the second torque command when the absolute value of the second basic torque is smaller than the predetermined value.

4. The hybrid vehicle according to claim 3, wherein the electronic control unit is configured to
   a) set the predetermined value as the second torque command when the second basic torque has a positive value in a case where the absolute value of the second basic torque is smaller than the predetermined value in the accelerator-off state, and
   b) set a second predetermined value obtained by inverting a sign of the predetermined value as the second torque command when the second basic torque has a negative value in the accelerator-off state.

* * * * *